United States Patent
Burnside et al.

(10) Patent No.: US 9,618,334 B2
(45) Date of Patent: Apr. 11, 2017

(54) SYSTEMS AND METHODS FOR MONITORING TURBINE COMPONENT STRAIN

(71) Applicant: General Electric Company, Schenectady, NY (US)

(72) Inventors: Jason Lee Burnside, Greenville, SC (US); Gregory Lee Hovis, Martinez, GA (US); Bryan J. Germann, Greenville, SC (US); John David Ward, Jr., Woodruff, SC (US); William F. Ranson, Columbia, SC (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 14/687,158

(22) Filed: Apr. 15, 2015

(65) Prior Publication Data

US 2016/0305769 A1 Oct. 20, 2016

(51) Int. Cl.
*G01B 11/16* (2006.01)
(52) U.S. Cl.
CPC .................................. *G01B 11/165* (2013.01)
(58) Field of Classification Search
CPC ........................................................ G01B 11/16
See application file for complete search history.

(56) References Cited

U.S. PATENT DOCUMENTS

| 5,321,977 A * | 6/1994 | Clabes ................... B82Y 35/00 |
| | | 250/307 |
| 7,533,818 B2 | 5/2009 | Hovis et al. |
| 8,234,083 B2 * | 7/2012 | Olesen ................... G01B 11/18 |
| | | 356/32 |
| 8,245,578 B2 | 8/2012 | Ranson et al. |
| 2009/0301215 A1 * | 12/2009 | McDearmon ............ G01B 7/16 |
| | | 73/774 |
| 2013/0202192 A1 * | 8/2013 | Telfer ...................... F03D 17/00 |
| | | 382/154 |
| 2014/0037217 A1 * | 2/2014 | Iliopoulos .............. G06T 7/2046 |
| | | 382/201 |
| 2014/0267677 A1 * | 9/2014 | Ward, Jr. ............ G02B 23/2484 |
| | | 348/82 |
| 2015/0346058 A1 * | 12/2015 | Ward, Jr. ............. B23K 26/364 |
| | | 73/112.01 |

* cited by examiner

*Primary Examiner* — Francis Gray
(74) *Attorney, Agent, or Firm* — Dority & Manning, P.A.

(57) ABSTRACT

Systems and methods for monitoring turbine component deformation are provided. The turbine component has an exterior surface. A method includes directly measuring a strain sensor configured on the exterior surface of the turbine component along an X-axis, a Y-axis and a Z-axis to obtain X-axis data points, Y-axis data points, and Z-axis data points. The X-axis, Y-axis and Z-axis are mutually orthogonal. The method further includes assembling a three-dimensional profile of the strain sensor based on the X-axis data points, Y-axis data points and Z-axis data points.

19 Claims, 5 Drawing Sheets

SYSTEMS AND METHODS FOR MONITORING TURBINE COMPONENT STRAIN

FIELD OF THE INVENTION

The present disclosure relates generally to systems and methods for monitoring turbine component strain, and in particular systems and methods which provide direct three-dimensional measurements of strain sensors configured on turbine components.

BACKGROUND OF THE INVENTION

Turbomachines are widely utilized in fields such as power generation and aircraft engines. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of a turbomachine, various components (collectively known as turbine components) within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, it is desirable to monitor turbine components for creep. One approach to monitoring turbine components for creep is to configure strain sensors on the components, and analyze the strain sensors at various intervals to monitor for deformations associated with creep strain. However, such deformation can in many cases be on the order of 0.01% of an original dimension, thus requiring specialized equipment for strain monitoring.

One approach to monitoring such strain sensors is to obtain two-dimensional images of the strain sensors, and compare the dimensions of the strain sensors in images taken at varying times for an associated turbine component. Typically, dimensions along two axes, such as length and width dimension along X- and Y-axes, can be directly measured in such images. However, dimensions along a third axis, such as a height or thickness dimension along a Z-axis, cannot be directly measured in such images. Rather, dimensions along this third axis are inferred through the contrast shown in the images. For example, digital image correlation may use two-dimensional images to assemble a three-dimensional profile. Contrast in the various images is utilized to obtain dimensions along a third axis in order to assemble the three-dimensional profile.

These approaches to measuring the third axes can lead to inaccuracies in resulting measurements. For example, if the device utilized to obtain the two-dimensional images is not identically positioned relative to a strain sensor for each image to be compared, unintended changes in contrast can result, leading to measurement inaccuracies.

Accordingly, alternative systems and methods for monitoring turbine component strain are desired in the art. In particular, system and methods which provide improved, accurate measurements in three dimensions would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for monitoring turbine component deformation is provided. The turbine component has an exterior surface. The method includes directly measuring a strain sensor configured on the exterior surface of the turbine component along an X-axis, a Y-axis and a Z-axis to obtain X-axis data points, Y-axis data points and Z-axis data points, wherein the X-axis, Y-axis and Z-axis are mutually orthogonal. The method further includes assembling a three-dimensional profile of the strain sensor based on the X-axis data points, Y-axis data points and Z-axis data points.

In accordance with another embodiment of the present disclosure, a system for monitoring turbine component deformation is provided. The turbine component has a strain sensor configurable on an exterior surface. The system includes a three-dimensional data acquisition device for analyzing the strain sensor, and a processor in operable communication with the three-dimensional data acquisition device. The processor is operable for directly measuring the strain sensor along an X-axis, a Y-axis and a Z-axis to obtain X-axis data points, Y-axis data points and Z-axis data points, wherein the X-axis, Y-axis and Z-axis are mutually orthogonal. The processor is further operable for assembling a three-dimensional profile of the strain sensor based on the X-axis data points, Y-axis data points and Z-axis data points.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
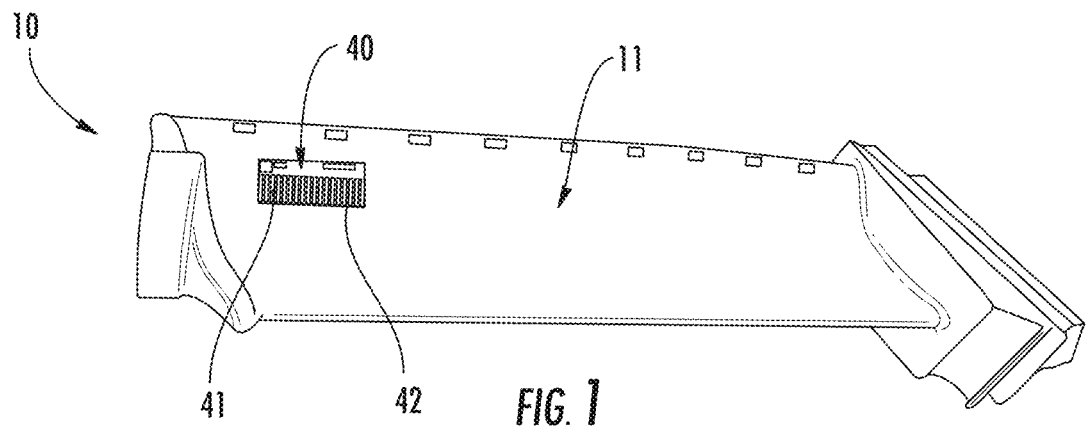
FIG. 1 is a perspective view of an exemplary turbine component comprising a strain sensor in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a turbine component 10 is illustrated with a strain sensor 40 configured on a portion of the turbine component's exterior surface 11. The turbine component 10 can comprise a variety of specific components such as those utilized in high temperature applications (e.g., components comprising nickel or cobalt based superalloys). For example, in some embodiments, the turbine component 10 may comprise a combustion component or hot gas path component. In some particular embodiments, the turbine component 10 may comprise a bucket, blade, vane, nozzle, shroud, rotor, transition piece or casing. In other embodiments, the turbine component 10 may comprise any other component of a turbine such as a component for a gas turbine, industrial gas turbine, steam turbine or the like.

The turbine component 10 has an exterior surface 11 on which one or more strain sensors 40 are configured. Strain sensors 40 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed strain sensors 40 using suitable mounting apparatus or techniques such as adhering, welding, brazing, etc.; or identifying pre-existing characteristics of the exterior surface 11 that can function as the components of a strain sensor 40.

Figure 2:
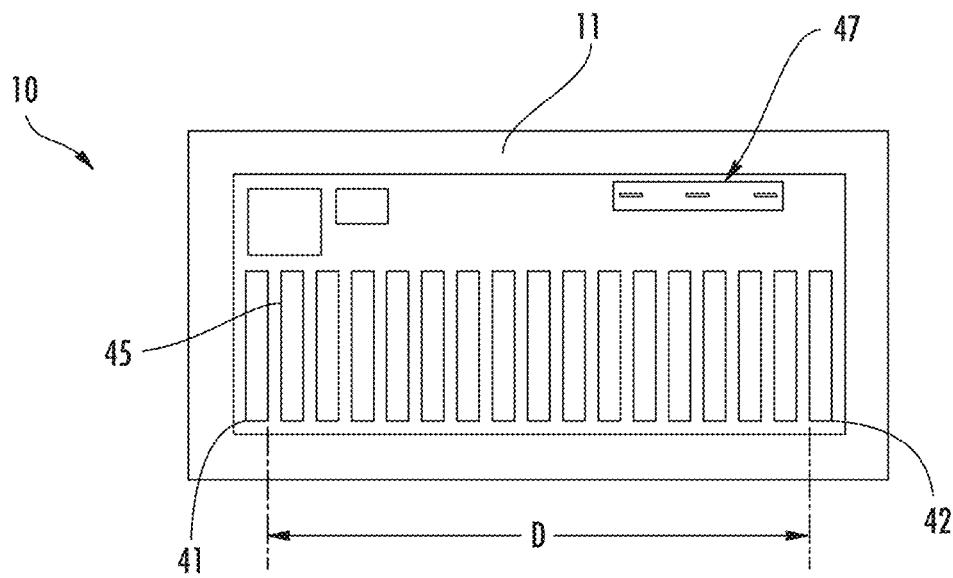
FIG. 2 is a top view of an exemplary strain sensor in accordance with one embodiment of the present disclosure.

Referring now to FIGS. 1 and 2, a strain sensor 40 is configured on a portion of the exterior surface 11 of the turbine component 10. The strain sensor 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the turbine component 10. The at least two reference points 41 and 42 can be disposed at a variety of distances and in a variety of locations depending on the specific turbine component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The strain sensor 40 may comprise a variety of different configurations and cross-sections such as by incorporating a variety of differently shaped, sized, and positioned reference points 41 and 42. For example, as illustrated in FIG. 2, the strain sensor 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the turbine component 10 by providing strain measurements across a greater variety of locations.

Furthermore, the dimensions of the strain sensor 40 may depend on, for example, the turbine component 10, the location of the strain sensor 40, the targeted precision of the measurement, application technique, and optical measurement technique. For example, in some embodiments, the strain sensor 40 may comprise a length and width ranging from less than 1 millimeter to greater than 300 millimeters. Moreover, the strain sensor 40 may comprise any thickness that is suitable for application and subsequent optical identification without significantly impacting the performance of the underlying turbine component 10. For example, in some embodiments, the strain sensor 40 may comprise a thickness of less than from about 0.01 millimeters to greater than 1 millimeter. In some embodiments, the strain sensor 40 may have a substantially uniform thickness. Such embodiments may help facilitate more accurate measurements for subsequent strain calculations between the first and second reference points 41 and 42.

In some embodiments, the strain sensor 40 may comprise a positively applied square or rectangle wherein the first and second reference points 41 and 42 comprise two opposing sides of said square or rectangle. In other embodiments, the strain sensor 40 may comprise at least two applied reference points 41 and 42 separated by a negative space 45 (i.e., an area in which the strain sensor material is not applied). The negative space 45 may comprise, for example, an exposed portion of the exterior surface 11 of the turbine component 10. Alternatively or additionally, the negative space 45 may comprise a subsequently applied visually contrasting material that is distinct from the material of the at least two reference points 41 and 42 (or vice versa).

As illustrated in FIG. 2, in some embodiments, the strain sensor 40 may include a unique identifier 47 (hereinafter "UID"). The UID 47 may comprise any type of barcode, label, tag, serial number, pattern or other identifying system that facilitates the identification of that particular strain sensor 40. In some embodiments, the UID 47 may additionally or alternatively comprise information about the turbine component 10 or the overall turbine that the strain sensor 40 is deposited on. The UID 47 may thereby assist in the identification and tracking of particular strain sensors 40, turbine components 10 or even overall turbines to help correlate measurements for past, present and future operational tracking.

The strain sensor 40 may thereby be configured in one or more of a variety of locations of various turbine components 10. For example, as discussed above, the strain sensor 40 may be configured on a bucket, blade, vane, nozzle, shroud, rotor, transition piece or casing. In such embodiments, the strain sensor 40 may be configured in one or more locations known to experience various forces during unit operation such as on or proximate airfoils, platforms, tips or any other suitable location. Moreover, the strain sensor 40 may be deposited in one or more locations known to experience elevated temperatures. For example the strain sensor 40 may be configured on a hot gas path or combustion turbine component 10.

In some embodiments, multiple strain sensors 40 may be configured on a single turbine component 10 or on multiple turbine components 10. For example, a plurality of strain sensors 40 may be configured on a single turbine component 10 (e.g., a bucket) at various locations such that the strain may be determined at a greater number of locations about the individual turbine component 10. Alternatively or additionally, a plurality of like turbine components 10 (e.g., a plurality of buckets) may each have a strain sensor 40 configured in a standard location so that the amount of strain experienced by each specific turbine component 10 may be compared to other like turbine components 10. In even some embodiments, multiple different turbine components 10 of the same turbine unit (e.g., buckets and vanes for the same turbine) may each have a strain sensor 40 configured thereon so that the amount of strain experienced at different locations within the overall turbine may be determined.

Referring now to FIGS. 4 through 7, various embodiments of systems 100 for monitoring turbine component 10 deformation, along with various methods 200 for monitoring turbine component 10 deformation, are provided. Such systems 100 and methods 200 in accordance with the present disclosure advantageously facilitate improved strain sensor 40 analysis by directly measuring strain sensors 40 along three axes (conventionally termed as an X-axis, Y-axis and Z-axis and which are mutually orthogonal). Systems 100 and methods 200 in accordance with the present disclosure generally utilize surface metrology techniques to obtain direct measurements of strain sensors 40 along three axes. In particular, non-contact surface metrology techniques may be utilized in exemplary embodiments. Because direct measurements along three axes can be performed in accordance with the present disclosure, inferred measurements along an axis based on contrast in two-dimensional images are advantageously not required, and the associated inaccuracies of such inferred measurements are avoided.

Figure 3:
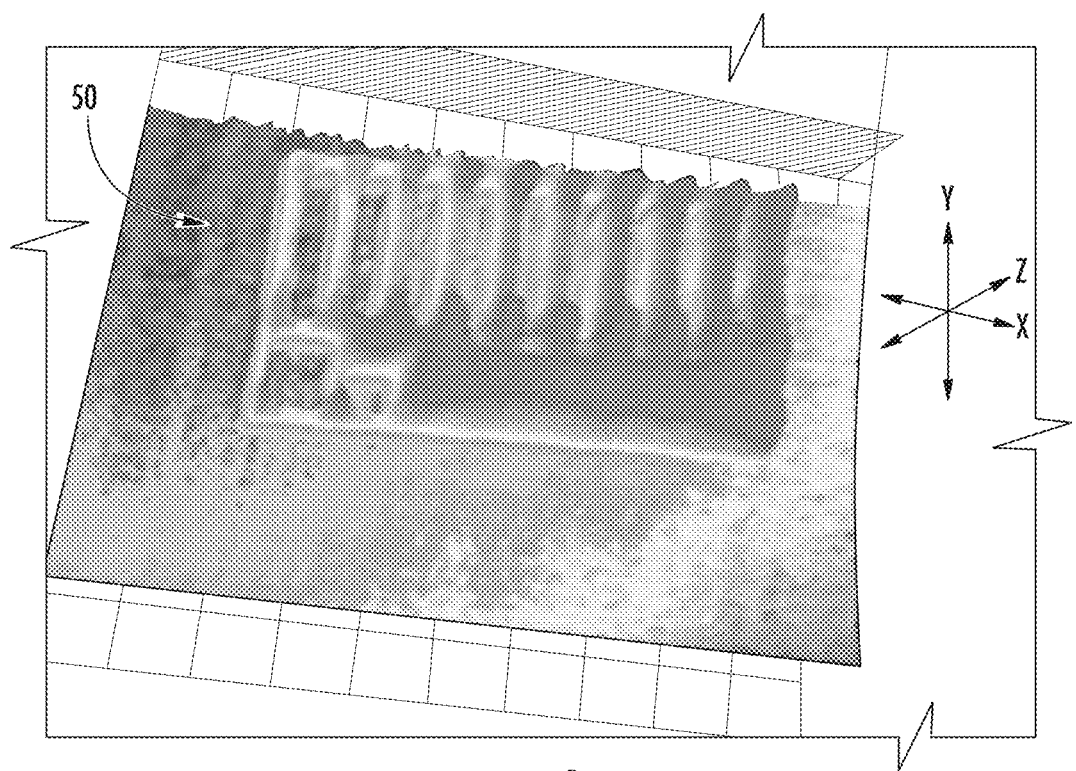
FIG. 3 is a directly measured three-dimensional profile of a strain sensor in accordance with one embodiment of the present disclosure.

Referring briefly to FIG. 3, a three-dimensional profile 50 of a strain sensor 40 is provided. Such profile has been assembled based on directly measured X-axis data points, Y-axis data points and Z-axis data points utilizing systems 100 and/or methods 200 in accordance with the present disclosure. Accordingly, a directly measured three-dimension surface contour for the strain sensor 40 can be obtained. Notably, such three-dimensional profiles 50 can advantageously be measured and assembled at different times for the associated turbine component 10, such as before use in a turbomachine or other operational use and after a period of such use or after varying periods of such use. Dimensional differences in the profiles can then be measured and utilized in, for example, subsequent strain calculation. Because each three-dimensional profile 50 is assembled using directly measured data points along all three axes, the accuracies of the profiles and dimensional differences in the profiles are advantageously improved.

Referring again to FIGS. 4 through 6, system 100 may include, for example, one or more strain sensors 40 which are configurable on the exterior surface 11 of one or more turbine components 10 as discussed above. Further, system 100 may include a three-dimensional data acquisition device 102 for analyzing one or more strain sensors 40, and a processor 104 in operable communication with the three-dimensional data acquisition device 102.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 104 may also include various input/output channels for receiving inputs from and sending control signals to various other components with which the processor is in communication, such as the three-dimensional data acquisition device 102. Processor 104 may further include suitable hardware and/or software for storing and analyzing inputs and data from the three-dimensional data acquisition device 102, and for generally performing method steps as described herein.

Notably, processor 104 or components thereof may be integrated within three-dimensional data acquisition device 102, and/or processor 104 or components thereof may be separate from three-dimensional data acquisition device 102. In exemplary embodiments, for example, processor 104 includes components that are integrated within three-dimensional data acquisition device 102 for initially processing data received by the three-dimensional data acquisition device 102, and components that are separate from three-dimensional data acquisition device 102 for assembling three-dimensional profiles 50 from the data and comparing these profiles.

In general, processor 104 is operable for directly measuring the strain sensor 40 along an X-axis, a Y-axis and a Z-axis to obtain X-axis data points, Y-axis data points, and Z-axis data points. As discussed, the axes are mutually orthogonal. The X-axis data points, Y-axis data points, and Z-axis data points are dimensional data points related to the direct measurement of the strain sensor 40. For example, the data points may indicate the location of the surface in one or more axes relative to a reference surface such as the exterior surface 11 of the turbine component 10, or relative to each other.

In general, any suitable three-dimensional data acquisition device 102 which utilizes surface metrology techniques to obtain direct measurements in three dimensions may be utilized. In exemplary embodiments, device 102 is a non-contact device which utilizes non-contact surface metrology techniques. Further, in exemplary embodiments, a device 102 in accordance with the present disclosure has a resolution along the X-axis, the Y-axis and the Z-axis of between approximately 100 nanometers and approximately 100 micrometers. Accordingly, and in accordance with exemplary methods, the X-axis data points, Y-axis data points, and Z-axis data points are obtained at resolutions of between approximately 100 nanometers and approximately 100 micrometers.

Figure 4:
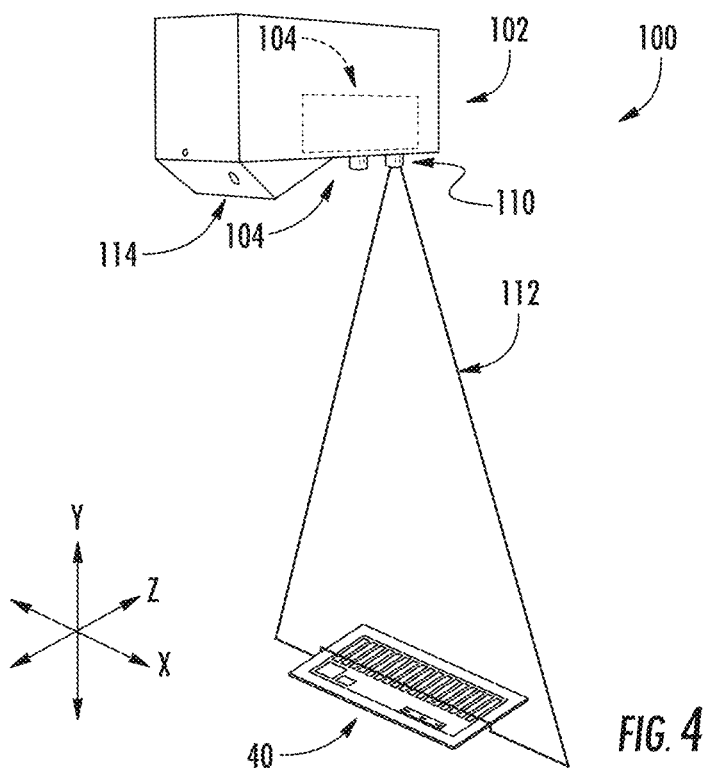
FIG. 4 is a perspective view of a system for monitoring turbine component strain in accordance with one embodiment of the present disclosure.
Figure 5:
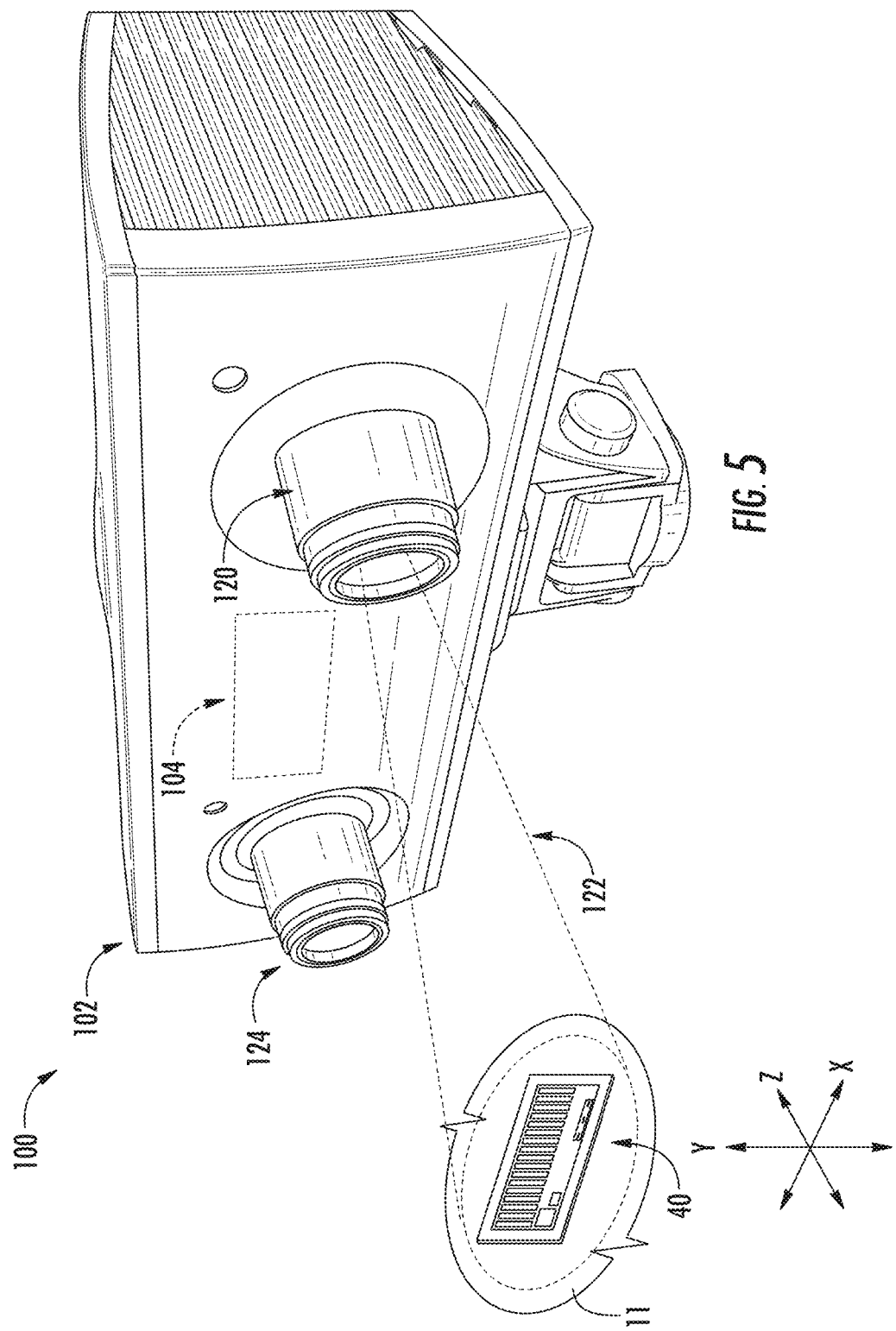
FIG. 5 is a perspective view of a system for monitoring turbine component strain in accordance with another embodiment of the present disclosure.
Figure 6:
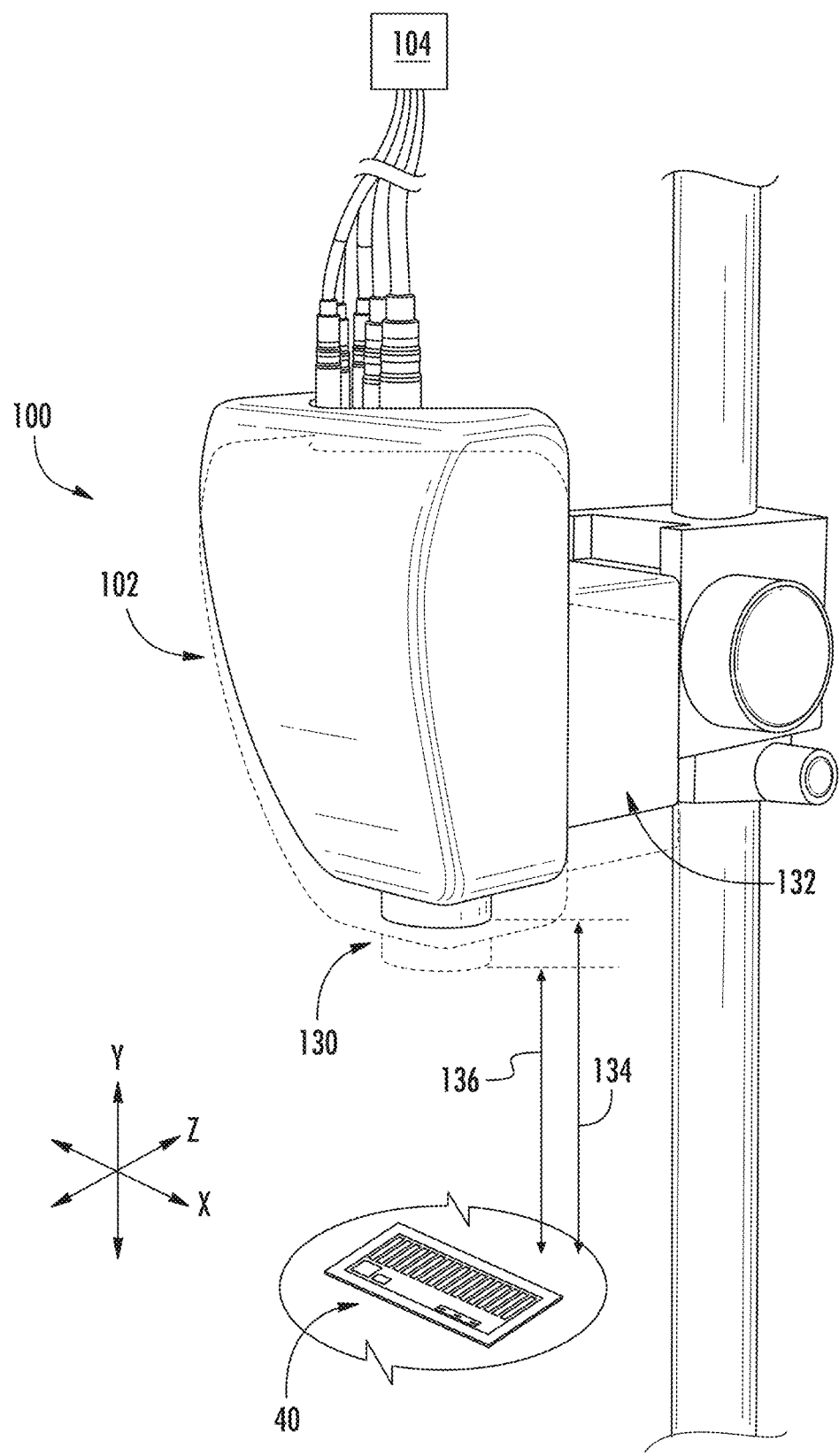
FIG. 6 is a perspective view of a system for monitoring turbine component strain in accordance with another embodiment of the present disclosure.

FIGS. 4 through 6 illustrate various embodiments of three-dimensional data acquisition devices 102 in accordance with the present disclosure. For example, as illustrated in FIG. 4, a device 102 in some exemplary embodiments is a laser scanner. Laser scanners generally include lasers 110 which emit light 112 in the form of laser beams towards objects, such as in these embodiments strain sensors 40 and turbine components 10 generally. The light 112 is then detected by a sensor 114 of the device 102. For example, in some embodiments, the light 112 is then reflected off of surfaces which it contacts, and received by a sensor 114 of the device 102. The round-trip time for the light 112 to reach the sensor 114 is utilized to determine measurements along the various axes. These devices are typically known as time-of-flight devices. In other embodiments, the sensor 114 detects the light 112 on the surface which it contacts, and determines measurements based on the relative location of the light 112 in the field-of-view of the sensor 114. These devices are typically known as triangulation devices. X-axis, Y-axis and Z-axis data points are then calculated based on the detected light, as mentioned. Notably, in exemplary embodiments processor 104 performs and operates such data acquisition devices 102 to perform various above disclosed steps.

In some embodiments, the light 112 emitted by a laser 110 is emitted in a band which is only wide enough to reflect off a portion of object to be measured, such as a strain sensor 40. In these embodiments, a stepper motor or other suitable mechanism for moving the laser 110 may be utilized to move the laser 110 and the emitted band as required until light 112 has been reflected off of the entire object to be measured.

FIG. 5 illustrates another embodiment of a three-dimensional data acquisition device 102, wherein the device 102 is a structured light scanner. Structured light scanners generally emit light 122 from include light-emitting diodes 120 or other suitable light generating apparatus. In exemplary embodiments, the emitted light 122 utilized by a structured light scanner is blue light or white light. In general, the emitted light 122 is projected onto the strain sensor 40 and turbine component 10 generally in a particular pattern. When the light 122 contacts the strain sensor 40, the surface contour of the strain sensor 40 distorts the light 122. This distortion is captured in an image taken by a camera 124. The image of the light 122 contacting the strain sensor 40 (and surrounding exterior surface 11) is received by, for example, the processor 104. Processor 104 then calculates X-axis data points, Y-axis data points, and Z-axis data points based on the received images by, for example, comparing the distortions in the light pattern to the expected pattern. Notably, in exemplary embodiments processor 104 performs and operates such data acquisition devices 102 to perform various above disclosed steps.

FIG. 6 illustrates another embodiment of a three-dimensional data acquisition device 102, wherein the device 102 is a microscope. The microscope generally includes a lens assembly 130 which can include one or more lenses, and further includes a stepper motor 132 or other suitable mechanism for moving the lens assembly to various distances 134, 136 from the strain sensor 40 and exterior surface 11. The lens assembly 130 is generally utilized to magnify images that are visible through the lens assembly 130, as is generally understood. Accordingly, such magnified images may be received, such as by the processor 104, for use in calculating data points. In particular, images may be received at various distances from the strain sensor 40 and exterior surface 11, such as a first distance 134 and a second distance 136. The stepper motor 132 may operate to step the lens assembly 130 between the various distance 134, 136, which in exemplary embodiments may be between approximately 1 and approximately 1,000 nanometers apart. The images received at the various distances 134, 136 may then be utilized to calculate X-axis data points, Y-axis data points, and Z-axis data points. For example, in each image, various different portions of the strain sensor 40 may be in focus while various other portions may be out of focus. The in focus and out of focus portions vary depending on the distance 134, 136 of the lens assembly from the strain sensor 40 and exterior surface 11. Accordingly, these portions can be correlated with the distances 134, 136 to obtain, for example, Z-axis data points, while X-axis and Y-axis data points can be conventionally measured. Notably, in exemplary embodiments processor 104 performs and operates such data acquisition devices 102 to perform various above disclosed steps.

As mentioned, after X-axis data points, Y-axis data points, and Z-axis data points are obtained for a strain sensor 40, a three-dimensional profile 50 of the strain sensor 40 may be assembled, such as by the processor 104, based on the X-axis data points, Y-axis data points, and Z-axis data points. For example, processor 104 may collect the data points and output a plot of all data points along relative X-, Y- and Z-axes. As discussed, FIG. 3 illustrates an exemplary output profile.

Further, multiple three-dimensional profiles 50 may be compared, such as by the processor 40. For example, differences in the locations along the X-, Y- and Z-axes of various features of the strain sensor 40 between multiple profiles may be observed and measured for use in subsequent strain calculations. Further, such strain calculations may be performed.

In exemplary embodiments, each profile of a strain sensor 40 which is compared to another profile is based obtained X-axis data points, Y-axis data points and Z-axis data points at a different time for the turbine component 10. For example, a first three-dimensional profile 50 may be based on data points obtained at a first time, and a second three-dimensional profile 50 may be based on data points obtained at a second time. First time may occur before use in service in a turbomachine or other operation, or may occur after a certain amount of such operation. Second time may occur after a certain amount of such operation, and in exemplary embodiments after first time has occurred. For example, a first time may be zero, for a newly manufactured turbine component 10, and a second time may occur after a particular period of time of service of the turbine component 10. By measuring the strain sensor 40 at these varying times, deformation, etc. and resulting strain due to use of the turbine component 10 in service may be calculated.

Figure 7:
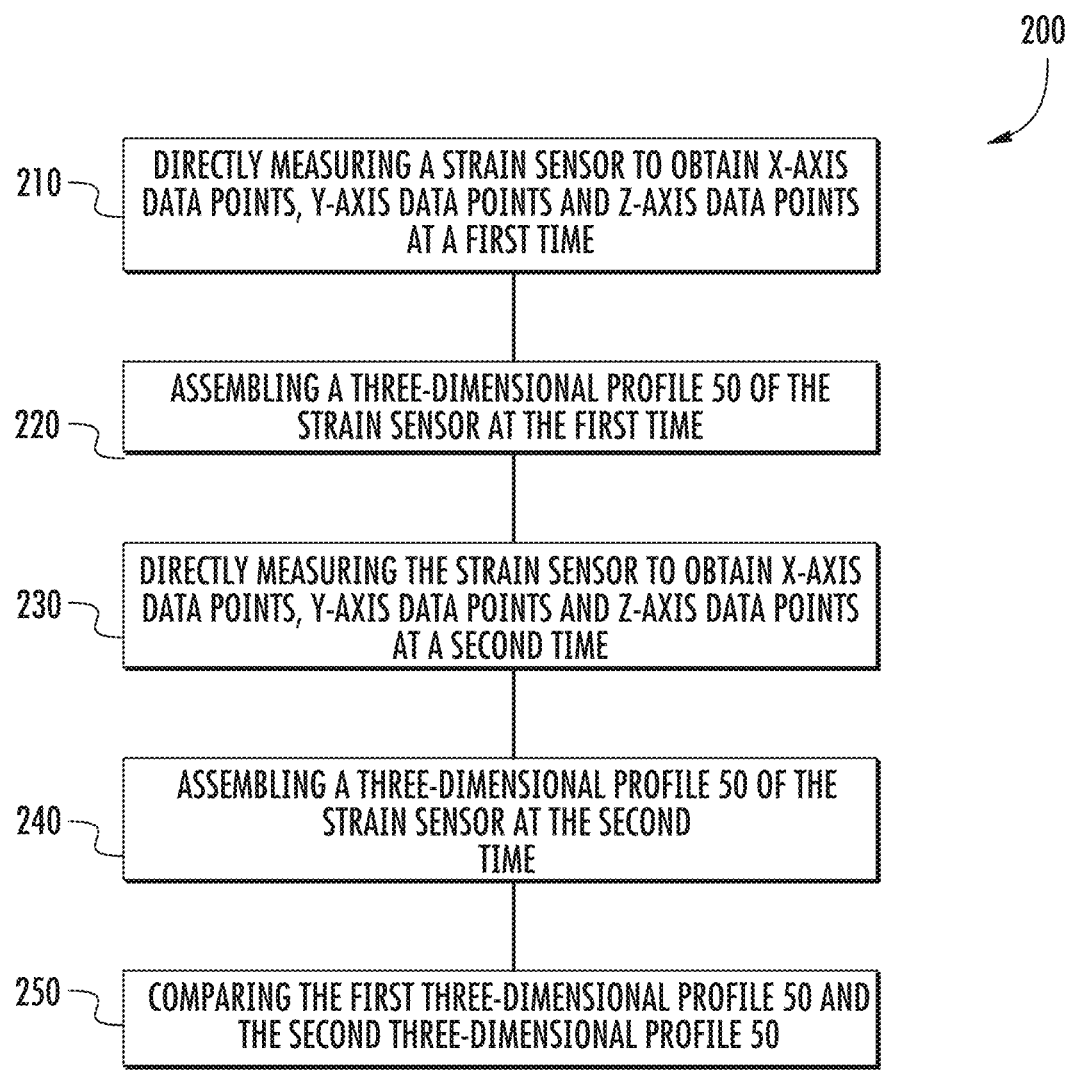
FIG. 7 is a flow chart illustrating a method for monitoring turbine component deformation in accordance with one embodiment of the present disclosure.

As mentioned, and referring now to FIG. 7, the present disclosure is additionally directed to methods 200 for monitoring turbine component 10 deformation. Such methods 200 in exemplary embodiment may be performed by processors 104, as discussed above. A method 200 may include, for example, the step 210 directly measuring a strain sensor 40 configured on the exterior surface 11 of the turbine component 10 along an X-axis, a Y-axis and a Z-axis to obtain X-axis data points, Y-axis data points, and Z-axis data points, as discussed above. A method 200 may further include, for example, the step 220 of assembling a three-dimensional profile 50 of the strain sensor based on the X-axis data points, Y-axis data points, and Z-axis data points, as discussed above.

In some embodiments, step 210 may occur at a first time, and the three-dimensional profile 50 may be based on the X-axis data points, Y-axis data points, and Z-axis data points at the first time, as discussed above. Method 200 may thus further include, for example, the step 230 of directly measuring the strain sensor 40 along the X-axis, Y-axis and Z-axis to obtain X-axis data points, Y-axis data points, and Z-axis data points at a second time, as discussed above. The second time may be different from, and in exemplary embodiments after, the first time. Further, method 200 may include, for example, the step 240 of assembling a second three-dimensional profile 50 of the strain sensor 40 based on the X-axis data points, Y-axis data points, and Z-axis data points at the second time, as discussed above. Still further, method 200 may include, for example, the step 250 of comparing the first three-dimensional profile 50 and the second three-dimensional profile 50, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring turbine component deformation, the turbine component having an exterior surface, the method comprising:
   directly measuring a strain sensor configured on the exterior surface of the turbine component along an X-axis, a Y-axis and a Z-axis to obtain X-axis data points, Y-axis data points and Z-axis data points, wherein the X-axis, Y-axis and Z-axis are mutually orthogonal; and
   assembling a three-dimensional profile of the strain sensor based on the X-axis data points, Y-axis data points and Z-axis data points.

2. The method of claim 1, wherein the strain sensor is directly measured using a non-contact direct measurement technique.

3. The method of claim 1, wherein the X-axis data points, Y-axis data points and Z-axis data points are obtained at resolutions of between approximately 100 nanometers and approximately 100 micrometers.

4. The method of claim 1, wherein the directly measuring step comprises:
   emitting light from a laser towards the strain sensor;
   detecting the light after the light is reflected; and
   calculating X-axis data points, Y-axis data points and Z-axis data points based on the detected light.

5. The method of claim 1, wherein the directly measuring step comprises:
   emitting light from a light-emitting diode;
   receiving images of the light contacting the strain sensor; and
   calculating X-axis data points, Y-axis data points and Z-axis data points based on the received images.

6. The method of claim 5, wherein the light is blue light.

7. The method of claim 5, wherein the light is white light.

8. The method of claim 1, wherein the directly measuring step comprises:
   receiving an image of the strain sensor at a first distance from the strain sensor;
   stepping from the first distance to a second distance from the strain sensor;
   receiving an image of the strain sensor at a second distance from the strain sensor; and
   calculating X-axis data points, Y-axis data points and Z-axis data points based on the received images.

9. The method of claim 1, wherein the directly measuring step occurs at a first time and the three-dimensional profile is a first three-dimensional profile based on the X-axis data points, Y-axis data points and Z-axis data points at the first time, and further comprising:
   directly measuring the strain sensor along the X-axis, Y-axis and Z-axis to obtain X-axis data points, Y-axis data points and Z-axis data points at a second time, the second time different from the first time; and
   assembling a second three-dimensional profile of the strain sensor based on the X-axis data points, Y-axis data points and Z-axis data points at the second time.

10. The method of claim 9, further comprising comparing the first three-dimensional profile and the second three-dimensional profile.

11. A system for monitoring turbine component deformation, the turbine component having a strain sensor configurable on an exterior surface, the system comprising:
   a three-dimensional data acquisition device for analyzing the strain sensor; and
   a processor in operable communication with the three-dimensional data acquisition device, the processor operable for:
      directly measuring the strain sensor along an X-axis, a Y-axis and a Z-axis to obtain X-axis data points, Y-axis data points and Z-axis data points, wherein the X-axis, Y-axis and Z-axis are mutually orthogonal; and
      assembling a three-dimensional profile of the strain sensor based on the X-axis data points, Y-axis data points and Z-axis data points.

12. The system of claim 11, wherein the data acquisition device is a non-contact data acquisition device.

13. The system of claim 11, wherein the data acquisition device has a resolution along the X-axis, the Y-axis and the Z-axis of between approximately 100 nanometers and approximately 100 micrometers.

14. The system of claim 11, wherein the data acquisition device is a laser scanner.

15. The system of claim 11, wherein the data acquisition device is structured light scanner.

16. The system of claim 15, wherein the structured light scanner emits white light.

17. The system of claim 15, wherein the structured light scanner emits blue light.

18. The system of claim 11, wherein the data acquisition device is a microscope, the microscope comprising a stepper motor.

19. The system of claim 11, wherein the processor is further operable for comparing multiple three-dimensional profiles.

* * * * *